(12) United States Patent
Eberspäch et al.

(10) Patent No.: US 6,540,150 B1
(45) Date of Patent: Apr. 1, 2003

(54) FUEL-OPERATED AIR HEATER

(75) Inventors: Günter Eberspäch, Wolfschlugen (DE); Walter Blaschke, Esslingen (DE)

(73) Assignee: J. Eberspacher GmbH & Co, KG (DE)

( * ) Notice: Subject to any disclaimer, the term of this patent is extended or adjusted under 35 U.S.C. 154(b) by 0 days.

(21) Appl. No.: 09/582,437

(22) PCT Filed: Jan. 9, 1999

(86) PCT No.: PCT/EP99/00086

§ 371 (c)(1),
(2), (4) Date: Jun. 23, 2000

(87) PCT Pub. No.: WO99/37957

PCT Pub. Date: Jul. 29, 1999

(30) Foreign Application Priority Data

Jan. 27, 1998 (DE) .......................................... 198 02 906

(51) Int. Cl.[7] .............................................. B60H 1/02
(52) U.S. Cl. ............................ 237/12.3 C; 126/110 B
(58) Field of Search ................... 237/12.3 C, 2 A; 126/110 B; 236/78 D, 21 B

(56) References Cited

U.S. PATENT DOCUMENTS 3,392,778 A   7/1968   Hubbard
4,411,385 A * 10/1983 Lamkewitz .................. 237/2 A
4,624,218 A * 11/1986 Bauml et al. ............ 122/136 R
4,836,444 A *  6/1989 Kawamura ................... 237/2 A
5,003,941 A *  4/1991 Jeffrey, Jr. et al. ..... 123/142.5 R
5,232,153 A *  8/1993 Mohring et al. ........ 237/12.3 C
5,788,148 A *  8/1998 Burner et al. ............... 237/2 A
5,878,950 A *  3/1999 Faccone et al. ........ 237/12.3 C
6,006,997 A * 12/1999 Pfister et al. ................ 237/2 A

FOREIGN PATENT DOCUMENTS

DE             44 46 829 A        7/1995

* cited by examiner

Primary Examiner—Derek Boles
(74) Attorney, Agent, or Firm—McGlew and Tuttle, P.C.

(57) ABSTRACT

A fuel-operated air heater (1) is disclosed, especially an air heater for automobiles that is operated independent from the motor. The inventive heater comprises a burner (2), a combustion chamber (3) and a heat exchanger (4). Hot air (5) is circulated through the combustion chamber (3) in a cup-shaped heat exchanger having a bottom that is closed on the inlet side and a hot air blower (10). The heat exchanger is also fitted with an overheat sensor (8) and a flame sensor (9) to monitor or detect overheating of the air heater during operation and the formation of flames during starting by means of a control device (6) and optionally to limit overheating or to disconnect the air heater. The overheat sensor (8) is mounted as a hot air temperature sensor in the area adjacent to the blower in the heat exchanger (4), especially with no wall contact in the hot air flow (5).

18 Claims, 2 Drawing Sheets

Figure 1:
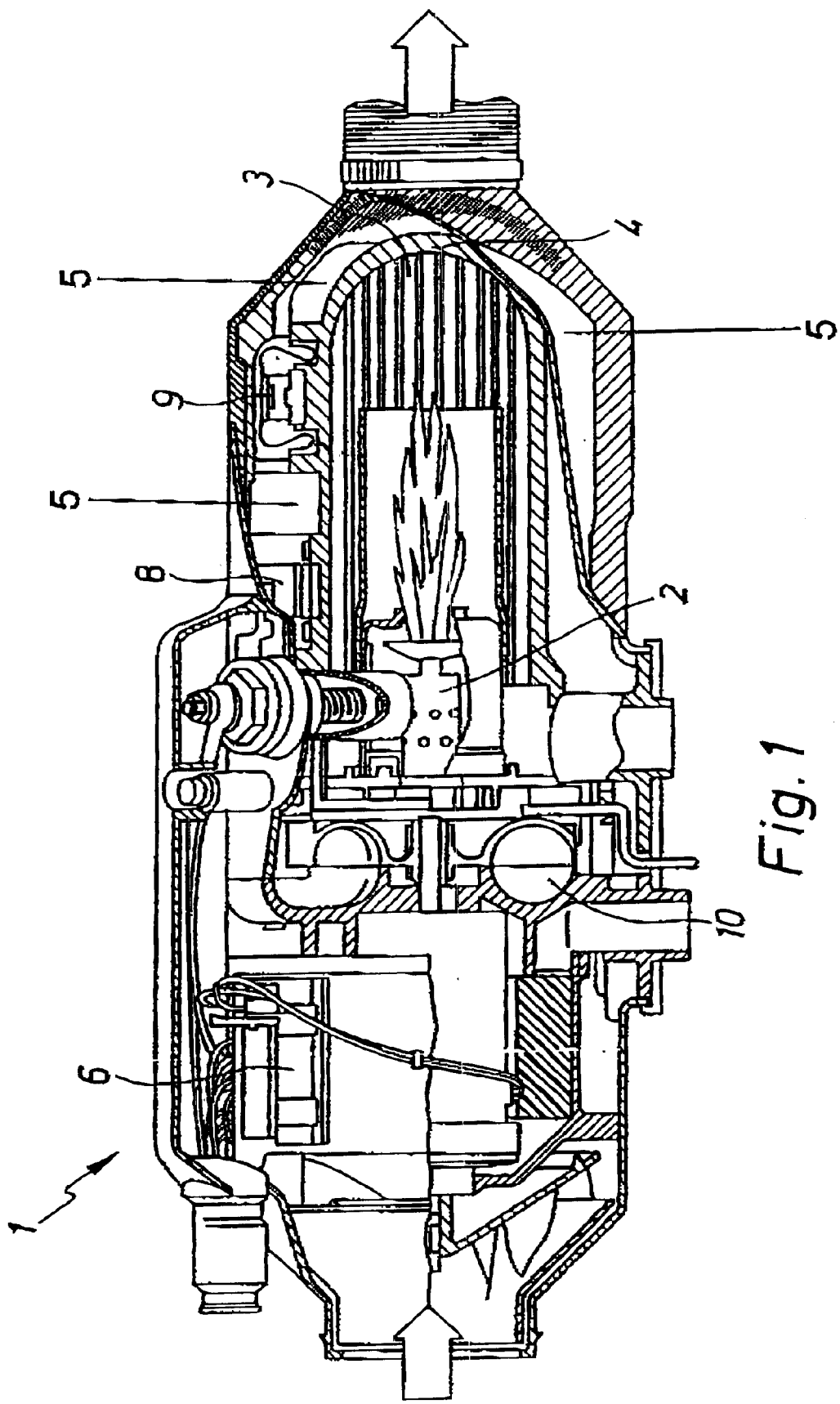

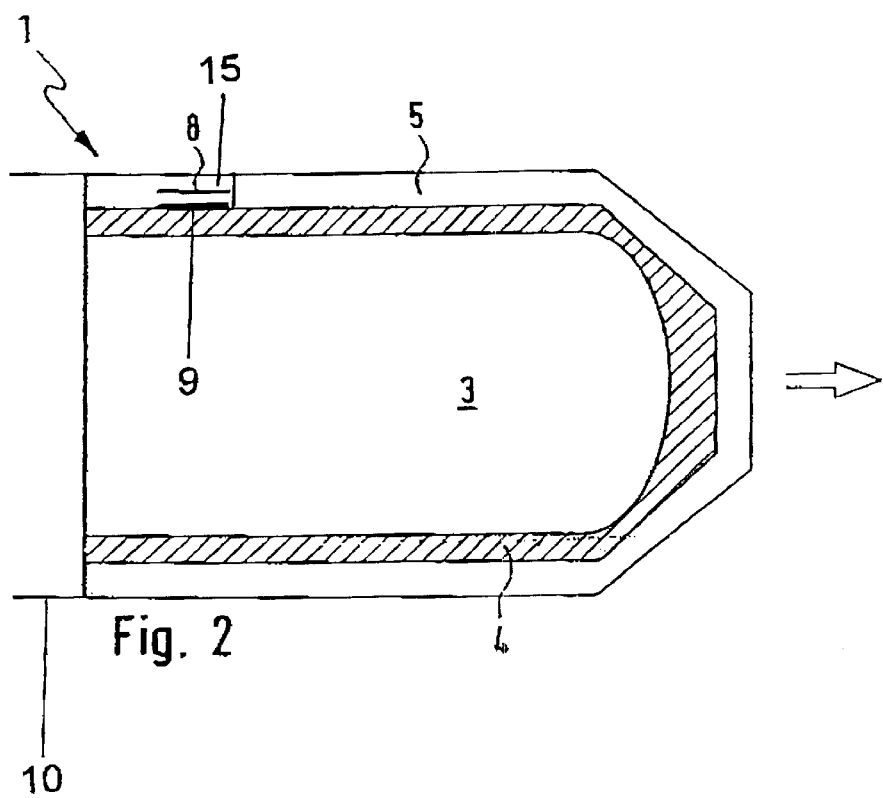
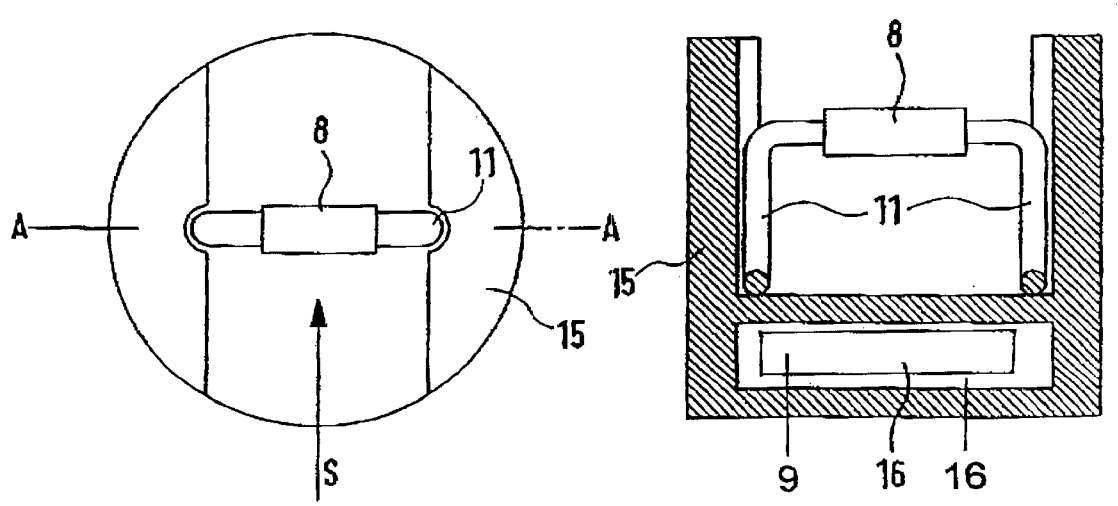

FUEL-OPERATED AIR HEATER

The present invention pertains to a fuel-operated air heater, especially an air heater operated independently from the engine for motor vehicles, according to the preamble of patent claim 1.

Air heaters are monitored by sensors to guarantee reliable operation. Distinction is made between two functions:
flame monitoring
overheating monitoring The flame monitoring serves the purpose of detecting a successful start and of reliably and rapidly recognizing flame blow-off.

The overheating monitoring is used to rapidly detect an unacceptably high component and heating air temperature, which is limited by law, as a consequence of the damming up of heating air or other disturbances.

It has been known that these functions can be monitored with two separate sensors. The flame sensor typically detects the temperature of the heat exchanger at a point suitable for this.

Prior-art overheating sensors detect a mixed temperature consisting of the component temperature and the heating air temperature at another point of the heat exchanger. Compliance with the heating air temperature limited by law can thus be ensured only with a lead with great temperature differences.

Another drawback of such an overheating sensor is that due to its design and the connection to the mass of the heat exchanger, it responds to suddenly occurring overheating conditions relatively sluggishly. Moreover, this effect is amplified by the design of the sensor. The sensor element is often seated in an enveloping tube and is separated from same by an air jacket. The signal is, moreover, also affected by the heat radiation of the heat exchanger and it therefore also depends on the heating output.

The object of the present invention is to create an air heater with overheating sensor and flame sensor of the type described in the introduction, in which the overheating sensor has a very simple design and is extensively insensitive to variations in the diameter of the outlet scoop at equal heating air mass and is arranged in the heat exchanger such that rapid detection of the particular measured quantity is reliably guaranteed.

The basic object of the present invention is accomplished by an air heater of the type described in claim 1.

The air heater is advantageously improved by the features of the dependent claims 2 through 15.

The essence of the present invention is that the overheating sensor is arranged as a heating air temperature sensor in the area of the heat exchanger near the blower. In the case of a combination of an overheating sensor and a flame sensor, the function is also guaranteed, especially in the case of short heat exchangers, in an area near the dome.

In particular, the overheating sensor is arranged in the heating air flow without being in contact with the wall.

An especially simple design and rapid response to temperature changes are obtained if the overheating sensor is designed as a nonencapsulated heating air temperature sensor.

The overheating sensor is preferably designed as small plates or as cylinders, which extend in the axial direction of the heat exchanger or at right angles thereto. In the case of a small plate extending transversely, the thickness of the plate also defines the leading edge.

The overheating sensor may be fastened, especially clipped, in a bracket provided, especially cast integrally, on the heat exchanger jacket.

The overheating sensor, the overheating switch and/or the flame sensor are preferably accommodated in a common holding means.

The signal of the overheating sensor can also be advantageously used to evaluate the degree of damming.

The overheating sensor may also be used in conjunction with at least one component sensor.

The signal of the flame failure controller is advantageously used as a redundancy in addition to the overheating sensor.

The case of overheating is detected with a heating output-dependent temperature characteristic.

The greatest temperature gradient is indicated by the overheating sensor according to the present invention.

Compliance with legal regulations concerning the limitation of the surface temperature and the heating air temperature is reliably and effectively guaranteed by the present invention.

Two cases are to be distinguished concerning the recognition of damming:

1. Creeping damming/partial damming

Creeping damming is characterized, e.g., by a slow clogging of an intake-side wire grid and is accompanied by a drop in the heating air mass. Partial coverage of the heating air inlet takes place in the case of an abrupt partial damming.

2. Abrupt complete damming

Complete coverage of the intake-side wire grid with impermeable material takes place in the case of the abrupt complete damming.

Both cases can be detected according to the present invention with a heating air temperature sensor at the blower-side end of the heat exchanger:

1. There is an essentially heating output-dependent temperature difference from the limited heating air discharge temperature (150° C.). Thus, such a case of overheating can be detected with a heating output-dependent characteristic. The dome temperature remains markedly below the maximum of 350° C. specified for the change in temperature in all cases of damming if the design of the heat exchanger is favorable.

2. The temperature measurement point shows the greatest gradient, as a result of which the most rapid recognition possible of complete damming is possible through the evaluation of the gradient.

When the damming is eliminated, the temperature also drops again most rapidly there. Since the damming is recognized quasi "immediately," the sluggish component temperatures can rise only slightly (the dome temperature remains below the permissible value). The sensor temperature drops again rapidly due to the heating air flow after the elimination of the damming. The heater is thus ready for use.

Other advantages of the sensor arrangement according to the present invention are as follows:

Overheating can also be recognized in the case of intake-side damming without discharge-side scoop.

The sensor is in the vicinity of the control device. The connection is thus very simple.

An inexpensive sensor for temperatures below 200° C. can be used. The cable insulation must meet only slight temperature requirements.

If the evaluation of the slight temperature difference between the heating air outlet and the heating air temperature at the proposed location at different output stages is eliminated, an inexpensive thermal switch can be used. The wiring for supply and signal evaluation in the control device can thus be eliminated.

Since the sensor is arranged in the gas flow, it does not have to be assembled as an expensive component sensor. It must only be clipped, e.g., as a plate in a bracket cast integrally on the jacket shell.

Another advantageous variant consists of integrating the flame and overheating sensors or switches in one housing, and as a result more costs are saved.

The heating air temperature at the proposed measurement point is far less dependent on the output than the component temperatures; an overheating sensor, which is designed as a component sensor, must be adjusted to the maximum allowable component temperature. As a result, at low burner outputs the threshold is very far from the actual component temperatures during normal operation. Thus, this already leads to unacceptably high heating air and jacket shell temperatures in the case of complete and partial damming before the threshold is reached. This effect is avoided with the sensor according to the present invention.

The signal can be used to evaluate the degree of damming. In the case of sample inserts, it is thus possible to recognize limit cases in which critical temperatures are known to be able to be reached due to resistances of the heating air flow during operation in limit cases (at high altitudes).

The signal offers a very good possibility of utilizing the flame failure controller as a redundancy in addition to the overheating sensor, especially compared with a combination of a short heat exchanger and two component sensors. The signal difference is very small in these combinations due to the short distance, so that the overheating evaluation may fail in the case of temperature gradients due to different time constants (e.g., due to manufacturing-related dispersions in assembly). If the sensor according to the present invention is used in conjunction with a component sensor, this effect can be reliably avoided due to the great temperature difference.

The present invention will be described in greater detail below on the basis of exemplary embodiments with reference to the attached drawings, in which:

FIG. 1 shows an axial section of a prior-art fuel-operated air heater with a heat exchanger, FIG. 2 schematically shows the heat exchanger according to FIG. 1 with an overheating sensor according to the present invention, and FIG. 3 shows a front view (to the left) and a section along line A—A (to the right) of a holding means of the overheating sensor together with a component sensor in the heating air flow of the heat exchanger.

According to FIG. 1, an air heater 1 operated with liquid fuel, especially an auxiliary heater of a motor vehicle, which is operated independently from the engine, comprises, among other things, a burner 2, a combustion chamber 3 and a heat exchanger 4, as well as a heating air blower 10 and a control device 6, which is controlled by an overheating recognition sensor 8 and a flame recognition sensor 9 in order to possibly switch off the heater when limit values are exceeded.

The heat carrier medium of the pot-shaped heat exchanger 4, namely, heating air 5, flows around the combustion chamber 3 and the combustion chamber 3 is closed off by the burner 2 on one front side according to FIG. 1, left. The combustion chamber 3 joins the heat exchanger bottom at a spaced location on the other front side.

The heat exchanger bottom of the air heater according to FIG. 1 is dome-shaped.

The heating air blower 10, a side-channel blower, is located to the left of the burner 2 in close proximity of the heat exchanger 4.

While the air heater 1 according to the state of the art according to FIG. 1 has an overheating sensor 8, which is arranged as a component sensor in the jacket area of the heat exchanger, the overheating sensor 8 of the air heater 1 according to the present invention according to FIG. 2 is located as a heating air temperature sensor in the area of the heat exchanger 4 near the blower, especially without contact with the wall, in the flow of the heating air 5.

The overheating sensor 8 is designed as a nonencapsulated heating air temperature sensor, namely, in the form of a sensor plate, which extends in the axial direction of the heat exchanger essentially in parallel to the heat exchanger jacket.

The sensor plate is clipped in a bracket (not shown), which is cast integrally on the heat exchanger jacket.

As an alternative, the overheating sensor 8 may be accommodated together with the flame sensor in a common holding means according to FIG. 3.

The holding means according to FIG. 3 shows the overheating sensor 8, which has a cylindrical shape in this exemplary embodiment and is located at right angles to the direction S of the oncoming flow. The sensor element is guided by connection wires 11 in the holder 15. The holder 15 is designed such that it also acts as a housing for a flame sensor. The space for installing the flame sensor is designated by the reference number 16.

It shall also be mentioned that independently patentable features contained in the subclaims shall have a corresponding independent protection despite the formal reference to the principal claim. All the inventive features contained in the entire application documentation also fall within the scope of protection of the present invention.

What is claimed is:

1. A fuel-operated air heater for motor vehicles, which heater is operated independently from the engine, the heater comprising:

a burner;

a combustion chamber;

a pot-shaped heat exchanger having a heat exchanger jacket with a dome bottom, said heat exchanger being positioned relative to the combustion chamber such that heating air flows around said combustion chamber in the pot-shaped heat exchanger having the dome bottom, said combustion chamber being closed by said burner on an inlet side;

a heating air blower connected at the inlet side;

an overheating sensor provided at the heat exchanger;

a flame sensor provided at the heat exchanger; and a control device connected to said burner and connected to said flame sensor and connected to said overheating sensor for monitoring and recognizing the overheating of the air heater during operation and monitoring and recognizing flame formation and limiting overheating or switching the heater off, said overheating sensor being arranged as a heating air temperature sensor in the area of said heat exchanger adjacent said blower, wherein said overheating sensor produces a signal used by said control device to evaluate a degree of damming of a flow of the beating air flowing around the combustion chamber in the pot-shaped heat exchanger.

2. A heater in accordance with claim 1, wherein said overheating sensor is arranged in the flow of the heating air without contact with the heat exchanger jacket.

3. A heater in accordance with claim 1, wherein said overheating sensor comprises a nonencapsulated heating air temperature sensor.

4. A heater in accordance with claim 1, wherein said overheating sensor comprises a sensor plate.

5. A heater in accordance with claim 4, wherein the sensor plate extends in an axial direction of said heat exchanger essentially in parallel to said heat exchanger jacket.

6. A heater in accordance with claim 3, wherein said overheating sensor comprises a cylindrical component.

7. A heater in accordance with claim 3, wherein said overheating sensor is arranged at a right angle with respect to a direction of flow.

8. A heat exchanger in accordance with claim 1, wherein said overheating sensor is one of fastened, clipped, in a bracket provided, and cast integrally on the heat exchanger jacket.

9. A heater in accordance with claim 1, wherein said overheating sensor and said flame sensor are accommodated in a common holding structure.

10. A heater in accordance with claim 1, wherein said overheating sensor is used in conjunction with at least one component sensor.

11. A fuel-operated air heater for motor vehicles, which heater is operated independently from the engine, the heater comprising:

a burner;

a combustion chamber;

a pot-shaped heat exchanger having a heat exchanger jacket with a dome bottom, said heat exchanger being positioned relative to the combustion chamber such that heating air flows around said combustion chamber in the pot-shaped heat exchanger having the dome bottom, said combustion chamber being closed by said burner on an inlet side;

a heating air blower connected at the inlet side;

an overheating sensor provided at the heat exchanger;

a flame sensor provided at the heat exchanger; and a control device connected to said burner and connected to said flame sensor and connected to said overheating sensor for monitoring and recognizing the overheating of the air heater during operation and monitoring and recognizing flame formation and limiting overheating or switching the heater off, said overheating sensor being arranged as a heating air temperature sensor in the area of said heat exchanger adjacent said blower, wherein a signal of said flame sensor is used by said control device as a redundant signal in addition to said overheating sensor.

12. A heater in accordance with claim 1, wherein the case of overheating is detected by said control device with a heating output-dependent temperature characteristic.

13. A heater in accordance with claim 1, wherein a greatest temperature gradient is indicated by said overheating sensor.

14. A heater in accordance with claim 1, wherein said overheating sensor is in the form of a thermal switch which switches at a defined temperature value.

15. A fuel-operated air heater for motor vehicles, the heater comprising:

a burner;

a combustion chamber;

a pot-shaped heat exchanger having a heat exchanger jacket with a dome portion, said heat exchanger being positioned relative to the combustion chamber such that heating air flows around said combustion chamber, said combustion chamber being closed by said burner on an inlet side;

a heating air blower connected at the inlet side;

a thermal sensor provided at the heat exchanger wherein said thermal sensor is an overheating sensor comprising a nonencapsulated heating air temperature sensor; and a control device connected to said burner and connected to said thermal sensor for monitoring and recognizing an overheating of the air heater during operation and limiting overheating or switching the heater off, said thermal sensor being arranged as a heating air temperature sensor at said inlet side of said heat exchanger adjacent to said blower.

16. A heater in accordance with claim 15, further comprising:

a dome portion in said heat exchanger jacket;

a flame sensor arranged adjacent to said dome portion.

17. A heater in accordance with claim 15, wherein said overheating sensor comprises a sensor plate.

18. A fuel-operated air heater for motor vehicles, the heater comprising:

a burner;

a combustion chamber;

a pot-shaped heat exchanger having a heat exchanger jacket with a dome portion, said heat exchanger being positioned relative to the combustion chamber such that heating air flows around said combustion chamber, said combustion chamber being closed by said burner on an inlet side;

a heating air blower connected at the inlet side;

a thermal sensor provided at the heat exchanger; and a control device connected to said burner and connected to said thermal sensor for monitoring and recognizing an overheating of the air heater during operation and limiting overheating or switching the heater off, said thermal sensor being arranged as a heating air temperature sensor in an area of said heat exchanger either adjacent to said blower or adjacent to said heater, said thermal sensor is arranged in the flow of the heating air without contact with said heat exchanger jacket.

* * * * *